United States Patent [19]

Morain

[11] Patent Number: 4,772,052
[45] Date of Patent: Sep. 20, 1988

[54] QUICK CONNECT COUPLING
[75] Inventor: Eldon W. Morain, Tulsa, Okla.
[73] Assignee: Handy & Harman Automotive Group, Inc., New York, N.Y.
[21] Appl. No.: 37,555
[22] Filed: Apr. 13, 1987
[51] Int. Cl.⁴ .............................................. F16L 37/00
[52] U.S. Cl. ................................... 285/305; 285/351; 285/921
[58] Field of Search .............. 285/305, 902, 321, 921, 285/351; 403/326

[56] References Cited
U.S. PATENT DOCUMENTS

| 3,314,696 | 4/1967 | Ferguson et al. | 285/305 X |
| 3,625,551 | 12/1971 | Branton et al. | 285/305 |
| 3,628,768 | 12/1971 | Hutt | 285/305 X |
| 4,635,974 | 1/1987 | Moussaian | 285/305 |

FOREIGN PATENT DOCUMENTS

| 2028711 | 12/1971 | Fed. Rep. of Germany | 285/305 |
| 1030535 | 5/1966 | United Kingdom | 285/305 |

Primary Examiner—Thomas F. Callaghan
Attorney, Agent, or Firm—Head & Johnson

[57] ABSTRACT

A readily attachable and detachable coupling for fluid conduits including a receptacle member having a passageway therethrough and having a notch formed in the external surface communicating with the passageway, the notch having a forward wall inclined at an acute angle to the member longitudinal axis and a rearward wall which is substantially perpendicular to the longitudinal axis, and a plug member of a diameter to be slideably received within the receptacle member passageway, the plug member having an enlarged external diameter portion spaced from the end, the receptacle member having a retention wire received therearound and extending within the notch and gaskets within the passageway so that when the plug member is inserted into the receptacle passageway, the enlarged diameter portion can push past the retention wire because the retention wire can expand against the inclined planar wall of the notch but after having passed is prohibited from being withdrawn from the receptacle member by the retention wire.

7 Claims, 1 Drawing Sheet

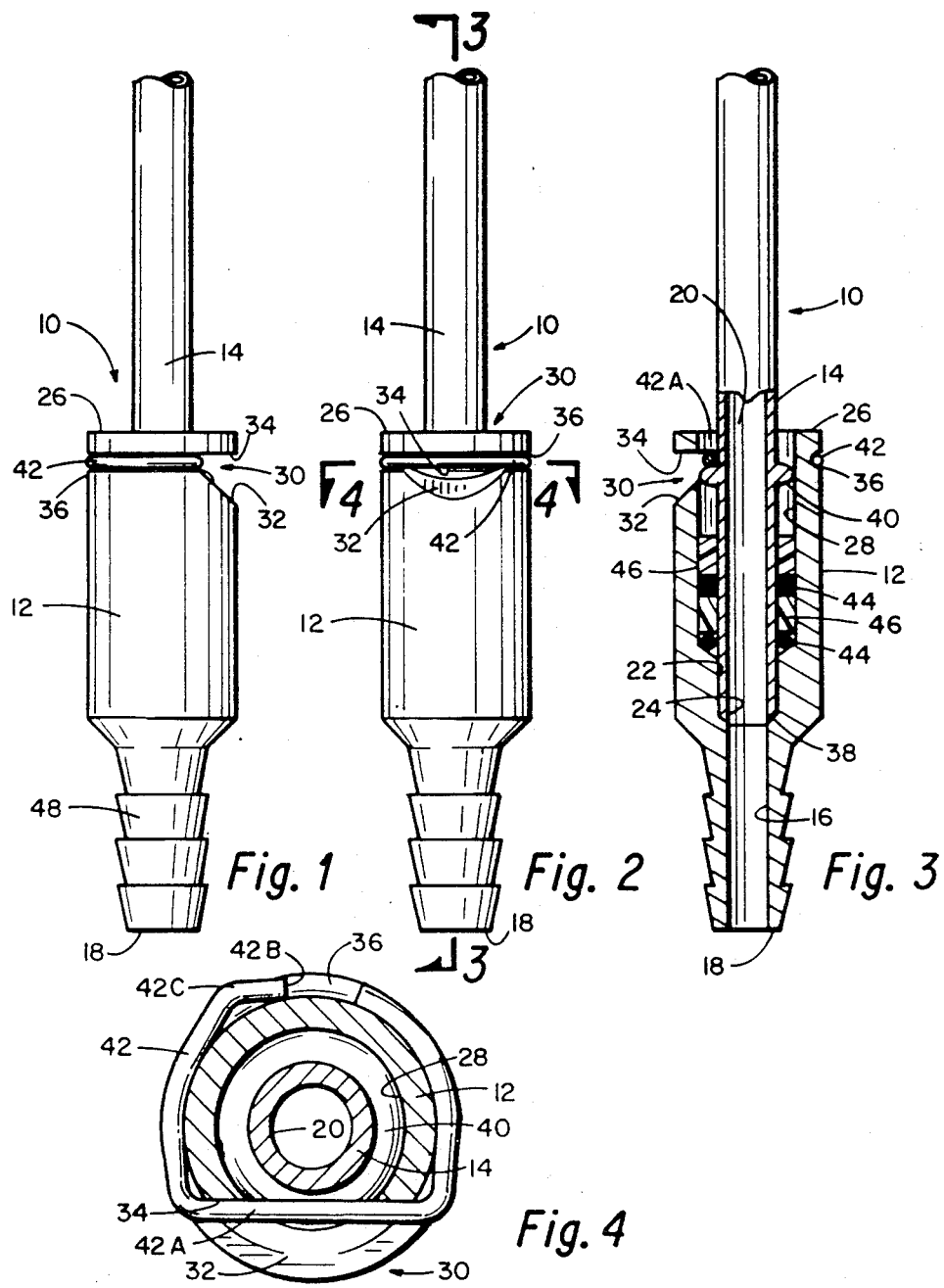

QUICK CONNECT COUPLING

SUMMARY OF THE INVENTION

In the manufacture of mechanical equipment, such as automobiles, trucks, etc., it is customary to employ quick disconnect devices used to connect conduits together. While conduits, such as piping, can be connected together in a variety of ways, well known for many years, including the common use of threaded couplings, for efficient assembly of the mechanisms; it is desirable to have available a fluid coupling which can be attached very expeditiously but which at the same time, once attached, is substantially failsafe.

Others have provided a variety of coupling devices and for background reference to the art to which the present invention relates reference should be had to the following U.S. Pat. Nos. 3,574,359; 3,453,005; 3,584,902; 4,009,896; 3,826,523; 2,441,344; 4,128,264; 4,005,883; 3,724,882; 4,080,752; 3,929,356; 4,123,089; 4,111,464; 2,123,889; 3,534,988; 4,123,091; 4,214,586; 3,538,940; 921,691; 3,711,125; and 4,135,745 and West German Pat. No. 26 22 269.

The present invention provides an improved highly effective coupling which can be very expeditiously employed to connect one tubular member to another tubular member by simply extending a portion of a plug member into a receptacle member. The members snap together without requiring any other action on the part of the assembler and once snapped together, resist separation. Further, the means by which the elements are attached to each other substantially eliminates the possibility of inadvertent disconnection even though provision is made so that the coupling can be manually disconnected when necessary.

The coupling for fluid conduits includes a receptacle member having a passageway through it coincident with the member longitudinal axis. The member has a first end and a second end. The passageway has an enlarged internal diameter portion adjacent the second end. A notch is formed in the receptacle member adjacent the second end. The notch extends from the member external surface into the enlarged internal diameter portion of the passageway. The notch is defined by two, generally planar surfaces. The first notch surface is in the direction towards the member first end and is inclined at an acute angle relative to the passageway longitudinal axis. The second surface of the notch is in the direction towards the member second end and is preferably generally perpendicular to the passageway longitudinal axis.

A tubular plug member is employed having a cylindrical forward end portion having an external diameter less than the internal diameter of the receptacle member enlarged internal diameter portion. The plug member is also further defined by an enlarged external diameter portion spaced from the forward end. The diameter of the enlarged portion is slightly less than the internal diameter of the receptacle member enlarged internal diameter portion.

A retention wire is positioned around the receptacle member and within the slot formed in the receptacle member. The portion of the retention wire extending within the receptacle member is preferably straight.

Gasket elements are positioned within the receptacle member passageway to snuggly receive the plug member forward end portion.

The coupling is connected together by inserting the plug member forward end portion into the receptacle member second end. The slug member forward end portion extends within the gaskets. The enlarged diameter portion of the receptacle member extends into the receptacle member enlarged internal diameter portion and engages the retention wire. As the plug member is pushed farther into the receptacle member the enlarged internal diameter portion displaces the portion of the retention wire received within the notch. Such displacement is possible because of the inclined angle of the forward wall of the notch. After the enlarged diameter portion passes the wire, it returns to its normal position within the notch extending rearwardly of the plug member enlarged diameter portion. The plug member is then locked to the receptacle member and can not be extracted from the receptacle member by direct force without employing a force sufficient to destroy some portion of the connector.

When it is desired to manually separate the plug member from the receptacle member the user can manipulate the wire so that it is raised within the notch to clear the plug member enlarged external diameter portion as the plug member is pulled rearwardly with respect to the receptacle member.

A better and more complete understanding of the invention will be had by reference to the following description and claims, taken in conjunction with the attached drawings.

DESCRIPTION OF THE DRAWINGS

FIG. 1 is an external view of the coupling of a preferred embodiment of the coupling of this invention.

FIG. 2 is also an external view of the preferred embodiment of the coupling, this view being taken with the coupling rotated 90° relative to FIG. 1.

FIG. 3 is a cross-sectional view of the coupling taken along the line 3—3 of FIG. 2 showing the internal arrangement.

FIG. 4 is a cross-sectional view taken along the line 4—4 of FIG. 2 showing more details of the internal arrangement of the coupling.

DESCRIPTION OF THE PREFERRED EMBODIMENT

Referring to the drawings the coupling for fluid conduits is generally indicated by the numeral 10 and includes a receptacle member 12 and a plug member 14. The receptacle member 12 has an internal passageway therethrough formed of three portions. The passageway first portion 16 extends from the receptacle member first end 18. The passageway first portion 16 is of a smaller internal diameter and typically corresponds to the internal diameter 20 of plug member 14 although in the practice of the invention it is not necessary that diameters 16 and 20 be the same. Adjacent the passageway first portion 16 is an intermediate passageway portion 22 which is of slightly increased internal diameter compared to passageway 16. At the juncture of passageways 16 and 22 an internal circumferential ledge 24 is formed. Extending from the intermediate passageway portion 22 to the receptacle member second end 26 is a third passageway portion 28 which is of enlarged internal diameter compared to the intermediate portion 22.

The receptacle member is provided with a notch generally indicated by the numeral 30 which extends from the external surface into the third or enlarged diameter passageway 28. Notch 30 is formed by a first planar surface 32 which extends in the direction towards the first end 18 and intersects the receptacle member longitudinal axis at an acute angle. The rearward portion of notch 30 is formed by wall 34 which preferably intersects the receptacle member longitudinal axis at about 90° as illustrated. In the practice of the invention the wall 34 may be in a plane which also intersects the longitudinal axis of member 12 at an acute angle—that is, walls 34 and 32 may be parallel to each other.

A circumferential recess 36 is formed in the exterior surface of the receptacle member 12 preferably in a plane perpendicularly the member longitudinal axis and coincident with the notch 30.

The plug member 14 is preferably of a stiff tubular material, such as metal or plastic and has a forward end 38. Spaced from the forward end 38 is an integral enlarged diameter portion 40. The external diameter of the plug member 14 in the area between the enlarged diameter portion 40 and forward end 38 is such as to be slideably but snugly received in the receptable member passageway intermediate portion 22. The diameter of the enlarged diameter portion 40 is such as to be snugly, but slideably received in the receptacle member third passageway portion 28.

Positioned on the receptacle member is a retention wire 42. The retention wire is received in the notch 30 and in the recess 36. The wire is bent, as best shown in FIG. 4, so that it includes a straight portion 42A received within the notch 30.

When the plug member 14 is inserted into the receptacle member 12 the enlarged diameter portion 40 engages wire straight portion 42A. As force is applied to the plug member relative to the receptacle member the straight wire portion 42A is expanded by moving upwardly on the inclined wall 32. This permits the enlarged diameter portion 40 to move past the wire straight portion 42A and when it has moved past then the wire portion 42A returns to its normal position engaging the rearward surface of the enlarged diameter portion 40. The plug member is then retained within the receptacle member and can not be inadvertently removed without the use of sufficient force to substantially destroy some portion of the coupling.

To intentionally remove the plug member from the receptacle member a user can rotate one end 42B of the wire within the recess 36. This will cause the straight portion 42A to be expanded outwardly within the slot and when expanded sufficiently the enlarged diameter portion 40 of the plug member may be moved rearwardly past the wire member. To augment engaging the end portion 42B a bent portion 42C is provided in the wire adjacent the end 42B. Thus, the coupling provides a means whereby the plug member may be intentionally removed from the receptacle member but wherein the possibility of the two members 12 and 14 becoming inadvertently separated is substantially non-existent.

Received within the receptacle member third passageway portion 28 are gaskets 44, such as in the form of O-rings 44 and short tubular gasket portions 46. These are merely representative of various kinds of gasketing materials which may be employed within the receptacle member so that a leak-proof sealed relationship is established between the exterior of the plug member 14 and the interior of the receptacle member 12.

In the preferred embodiment as illustrated the length of the plug member between the enlarged diameter portion 40 and the forward end 38 is such that the forward end engages the ledge 24 when the coupling is completed, that is, with the wire straight portion 42A rearwardly of the enlarged diameter portion 40.

The receptacle member 12 is shown with serrated portions 48 adjacent the first end 18. This is merely exemplary of the use of the coupling for attaching to a flexible hose or the like which can be applied over the serrated portions. It is understood that the receptacle member 24 may be provided with a variety of other means for attachment to apparatus. One obvious embodiment would replace the serrations 48 with threads so that the receptacle member may be threaded directly into some other member, such as an engine, vessel, or the like. Another embodiment includes duplicating the receptacle member as a mirror image in place of serrations 48 so that two tubes can be connected together.

The claims in the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A readily attachable and detachable coupling for fluid conduits, comprising:

a receptacle member having a passageway therethrough coincident with a longitudinal axis and having a first end and a second end, the passageway having an enlarged internal diameter portion adjacent said second end, the receptacle member having a notch formed therein adjacent said second end, the notch extending from the receptacle member exterior surface into said enlarged diameter passageway, the notch having a forward wall in the direction towards said first end and a rearward wall in the direction towards said second end, the forward wall being in a plane intersecting said receptacle member longitudinal axis at an acute angle and the rearward wall being in a place intersecting the receptacle member longitudinal axis radially thereof;

a tubular plug member having a forward end portion having an external diameter less than said enlarged internal diameter portion of said receptacle member passageway and being slidably receivable within said receptacle member, the plug member having a forward end and a short length, radially extending enlarged external diameter portion spaced from said forward end, the enlarged diameter portion being slideably receivable within said receptacle member enlarged internal diameter passageway;

a retention wire received about said receptacle member and fixed axially thereto and a portion of said retention wire being received within said notch; and gasket means within said receptacle member passageway, said plug member being insertable within said receptacle member passageway, the enlarged diameter portion displacing said portion of said retention wire outwardly and on said forward wall, and after the enlarged diameter portion passes the wire portion, the wire portion returns to a seated position rearwardly of said enlarged diameter portion to thereby retain said plug member within said receptacle member, said gasket means sealing the external surface of said plug member to the receptacle member passageway.

2. A coupling according to claim 1 wherein said wire is substantially straight in said notch and curves around at least a substantial portion of the balance of the external circumferential surface of said receptacle member.

3. A coupling according to claim 1 wherein said receptacle has a circumferential recess in the exterior surface thereof in a plane perpendicular said longitudinal axis and coincident with said notch, said retention wire being received in said notch and in said recess.

4. A coupling according to claim 1 wherein said passageway in said receptacle member is defined by a first smaller internal diameter portion adjacent said first end, a second larger intermediate internal diameter portion adjacent said first portion forming a circumferential ledge between the smaller and intermediate diameter portions, and a third larger interior diameter portion between said intermediate portion and said second end, and wherein said plug member forward end portion is of external diameter greater than said receptacle member passageway first portion and slightly smaller in external diameter than said passageway second portion to be thereby slideably and snuggly received in said passageway second portion.

5. A coupling according to claim 4 wherein the spacing between said notch and said circumferential ledge of said receptacle member is substantially equal to the spacing between said plug member forward end and said enlarged external diameter portion whereby said plug member forward end is held in engagement with said receptacle member circumferential ledge when said plug member is retained within said receptacle member.

6. A coupling according to claim 1 wherein said gasket means is in the form of at least one gasket having an external diameter substantially equal the internal diameter of said receptacle member passageway and is slideably positionable therein and the internal diameter of said gasket is substantially equal to the external diameter of said tubular plug member, the tubular plug member being slideably receivable therein.

7. A coupling according to claim 6 wherein said gasket means is in the form of a plurality of gaskets contiguously positioned within said receptacle member passageway.

* * * * *